United States Patent
Warren et al.

(10) Patent No.: US 11,669,731 B2
(45) Date of Patent: Jun. 6, 2023

(54) SOLVING BASED INTROSPECTION TO AUGMENT THE TRAINING OF REINFORCEMENT LEARNING AGENTS FOR CONTROL AND PLANNING ON ROBOTS AND AUTONOMOUS VEHICLES

(71) Applicant: HRL Laboratories, LLC, Malibu, CA (US)

(72) Inventors: Michael A. Warren, Northridge, CA (US); Christopher Serrano, Glendora, CA (US)

(73) Assignee: HRL LABORATORIES, LLC, Malibu, CA (US)

( * ) Notice: Subject to any disclaimer, the term of this patent is extended or adjusted under 35 U.S.C. 154(b) by 803 days.

(21) Appl. No.: 16/691,446

(22) Filed: Nov. 21, 2019

(65) Prior Publication Data

US 2020/0226464 A1    Jul. 16, 2020

Related U.S. Application Data

(60) Provisional application No. 62/792,352, filed on Jan. 14, 2019.

(51) Int. Cl.
  *G06N 3/08* (2023.01)
  *G06N 3/088* (2023.01)
  *G06N 3/048* (2023.01)

(52) U.S. Cl.
  CPC .............. *G06N 3/08* (2013.01); *G06N 3/088* (2013.01); *G06N 3/048* (2023.01)

(58) Field of Classification Search
  CPC ........ G06N 3/08; G06N 3/088; G06N 3/0481; G06N 3/0454; G06N 3/006; G06N 5/006
  See application file for complete search history.

(56) References Cited

PUBLICATIONS

Tuncali ("Reasoning about Safety of Learning-Enabled Components in Autonomous Cyber-physical Systems") arXiv:1804.03973v1 [cs.SY] Apr. 11, 2018 (Year: 2018).*
Zhu ("Applying Formal Methods to Reinforcement Learning") GALOIS-17-03 (Year: 2017).*
Wu ("Learn to Steer through Deep Reinforcement Learning") Sensors 2018, 18, 3650; doi:10.3390/s18113650 www.mdpi.com/journal/sensors (Year: 2018).*
Zhang ("Human-like autonomous vehicle speed control by deep reinforcement learning with double Q-learning") 2018 IEEE Intelligent Vehicles Symposium (IV) (Year: 2018).*

(Continued)

*Primary Examiner* — Kakali Chaki
*Assistant Examiner* — Su-Ting Chuang
(74) *Attorney, Agent, or Firm* — Tope-McKay & Associates

(57) ABSTRACT

Described is a system for controlling a mobile platform. A neural network that runs on the mobile platform is trained based on a current state of the mobile platform. A Satisfiability Modulo Theories (SMT) solver capable of reasoning over non-linear activation functions is periodically queried to obtain examples of states satisfying specified constraints of the mobile platform. The neural network is then trained on the examples of states. Following training on the examples of states, the neural network selects an action to be performed by the mobile platform in its environment. Finally, the system causes the mobile platform to perform the selected action in its environment.

12 Claims, 6 Drawing Sheets

(56) References Cited

PUBLICATIONS

Gopinath (DeepSafe: A Data-Driven Approach for Assessing Robustness of Neural Networks) ATVA 2018, LNCS 11138, pp. 3-19, 2018. (Year: 2018).*

Notification of and the International Preliminary Report on Patentability Chapter II for PCT/US2019/062699, dated Jan. 7, 2021.

Micheli, Andrea, "Planning and Scheduling in Temporally Uncertain Domains", Dissertation, Universita Degli Studi Di Trento, Jan. 2016.

Chaves, Lennon Correa, "Formal Verification Applied to Attitude Control Software of Unmanned Aerial Vehicles", Dissertation, Universidade Federal do Amazonas. Feb. 2018.

Notification of Transmittal, the International Search Report, and the Written Opinion of the International Searching Authority for PCT/US2019/062699, dated Mar. 5, 2020.

He Zhu et al: "Applying Formal Methods to Reinforcement Learning", Oct. 1, 2017 (Oct. 1, 2017), XP055669781, Retrieved from the Internet : URL:https:/jgalois.comjwp-contentjuploads/2017/10/galois-formal-methods-reinforcement-learning.pdf [ret rieved on Feb. 18, 2020] abstract chapters 1-5; p. 1-p. 7.

Nathan Fulton et al: "Safe Reinforcement Learning via Formal Methods: Toward Safe Control Through Proof and Learning", AAAAI Conference on Artificial Intelligence, Feb. 1, 2018 (Feb. 1, 2018), XP055669947, abstract p. 1-p. 2, p. 4, chapters "Provably Safe Learning"—"Related Work"; p. 4-p. 8.

Burton, S.H., 2010. Coping with the Curse of Dimensionality by Combining Linear Programming and Reinforcement Learning, pp. 9-53.

Littman, M.L., 1994. Markov games as a framework for multi-agent reinforcement learning. In Machine Learning Proceedings, pp. 157-163.

Greenwald, A., Hall, K. and Serrano, R., 2003. Correlated Q-learning. In ICML, vol. 3, pp. 242-249.

Pham, T.H., De Magistris, G. and Tachibana, R., 2017. OptLayer-Practical Constrained Optimization for Deep Reinforcement Learning in the Real Worid. arXiv preprint arXiv: 1709.07643, pp. 1-8.

Amos, B. and Kolter, J.Z., 2017. Optnet: Differentiable optimization as a layer in neural networks. arXiv preprint arXiv: 1703.00443, pp. 1-13.

* cited by examiner

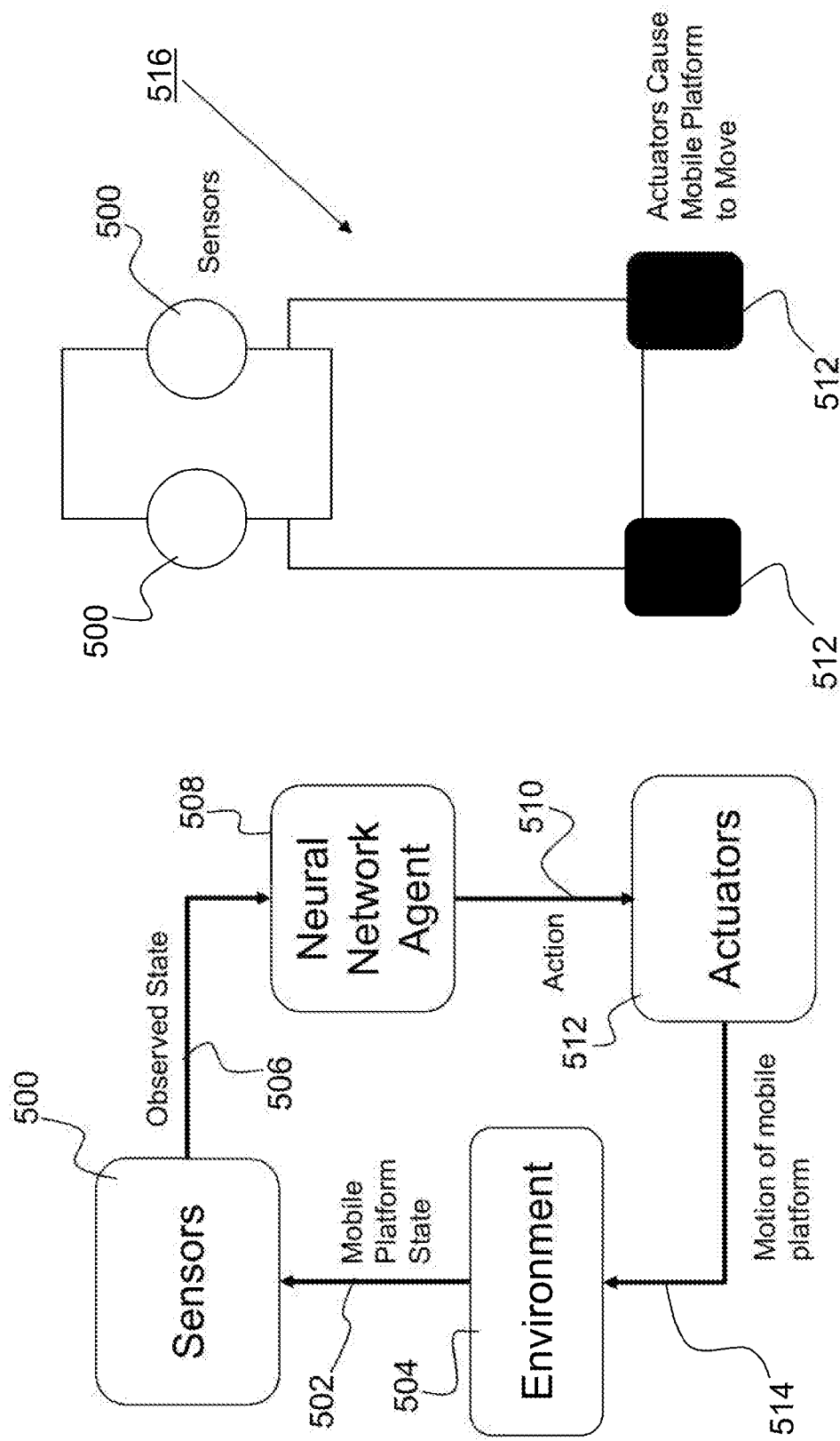

SOLVING BASED INTROSPECTION TO AUGMENT THE TRAINING OF REINFORCEMENT LEARNING AGENTS FOR CONTROL AND PLANNING ON ROBOTS AND AUTONOMOUS VEHICLES

CROSS-REFERENCE TO RELATED APPLICATIONS

This is a Non-Provisional application of U.S. Provisional Application No. 62/792,352, filed in the United States on Jan. 14, 2019, entitled, "Solving Based Introspection to Augment the Training of Reinforcement Learning Agents for Control and Planning on Robots and Autonomous Vehicles," the entirety of which is incorporated herein by reference.

BACKGROUND OF INVENTION

(1) Field of Invention

The present invention relates to a system for controlling robots and autonomous vehicles, and more particularly, to a system for controlling robots and autonomous vehicles that allows a learning agent to improve its learning outcomes without exposing it to potentially dangerous experiences.

(2) Description of Related Art

Linear programming is a type of solving technique. Prior use of linear programming in reinforcement learning has focused on constraining the exploration space for the agent's policy to improve both the speed of convergence and the quality of the policy converged to or as a replacement for more traditional Dynamic Programming methods in Q-Learning to solve for equilibria policies in zero-sum multi-agent Markov game Markov decision processes (MDPs), as described in Literature Reference Nos. 1, 2, and 3 of the List of Incorporated Literature References. Previous work has also been done on incorporating Quadratic Program solvers to restrict agent exploration to 'safe' trajectories by constraining the output of a neural network policy (see Literature Reference Nos. 4 and 5).

While linear programming, as used in the prior art, is a well-known technique in applied mathematics and engineering, Satisfiability Modulo Theories (SMT)-solving is little known outside of the area of "formal methods" from computer science. Additionally, not many from the formal methods community are acquainted with reinforcement learning. Finally, even for those familiar with SMT-solving, in order to be able to introspect over the state of the neural network it is necessary to have expertise with SMT-solving techniques that are capable of handling non-linear activation functions efficiently.

Thus, a continuing need exists for a system that can improve its learning outcomes by gathering state data without requiring that an agent actually experience the gathered states in order to control a mobile platform.

SUMMARY OF INVENTION

The present invention relates to a system for controlling robots and autonomous vehicles, and more particularly, to a system for controlling robots and autonomous vehicles that allows a learning agent to improve its learning outcomes without exposing it to potentially dangerous experiences. The system comprises a mobile platform and one or more processors and a non-transitory computer-readable medium having executable instructions encoded thereon such that when executed, the one or more processors perform multiple operations. The system trains a neural network $\pi$ that runs on the mobile platform based on a current state of the mobile platform. A Satisfiability Modulo Theories (SMT) solver capable of reasoning over non-linear activation functions is periodically queried to obtain a plurality of examples of states satisfying specified constraints of the mobile platform. The neural network $\pi$ is trained on the plurality of examples of states. Following training on the plurality of examples of states, the system selects an action to be performed by the mobile platform in its environment, and causes the mobile platform to perform the selected action in its environment.

In another aspect, the SMT solver is queried according to a query schedule.

In another aspect, the system generates the plurality of examples of states utilizing the SMT solver by implementing a state space quantization algorithm.

In another aspect, the system applies at least one query constraint when generating the plurality of examples of states.

In another aspect, a processing algorithm is applied to the plurality of examples of states, resulting in a set of processed examples of states, and the neural network $\pi$ is trained on the set of processed examples of states.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed description of the various aspects of the invention in conjunction with reference to the following drawings, where:

FIG. 5A is a flow diagram illustrating an example operation of the system for controlling robots and autonomous vehicles according to some embodiments of the present disclosure; and FIG. 5B is a diagram illustrating an example mobile platform according to some embodiments of the present disclosure.

DETAILED DESCRIPTION

Figure 1:
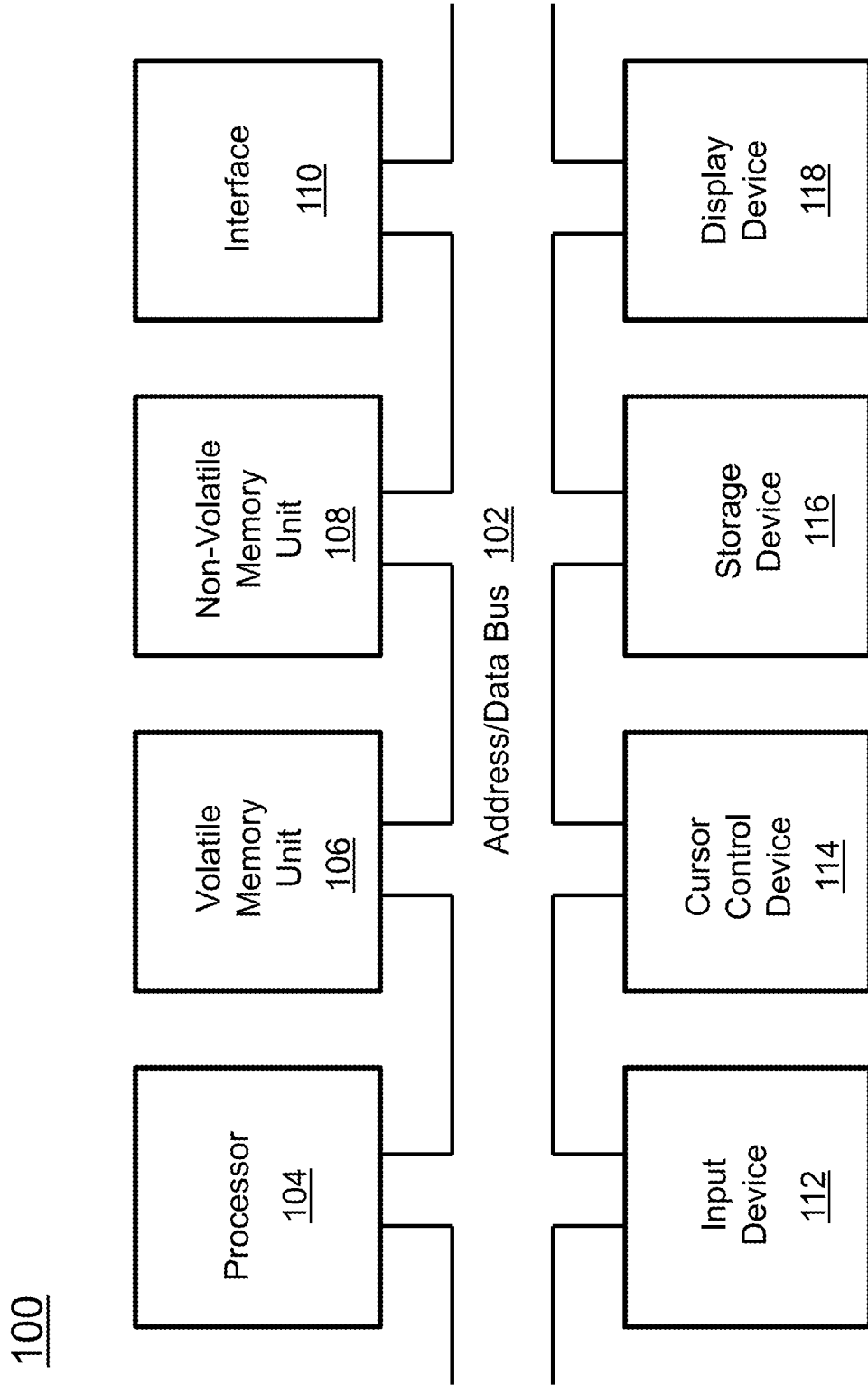
FIG. 1 is a block diagram depicting the components of a system for controlling robots and autonomous vehicles according to some embodiments of the present disclosure.

The present invention relates to a system for controlling robots and autonomous vehicles, and more particularly, to a system for controlling robots and autonomous vehicles that allows a learning agent to improve its learning outcomes without exposing it to potentially dangerous experiences. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Next, a description of the various principal aspects of the present invention is provided. Finally, specific details of various embodiment of the present invention are provided to give an understanding of the specific aspects.

(1) List of Incorporated Literature References

The following references are cited and incorporated throughout this application. For clarity and convenience, the references are listed herein as a central resource for the reader. The following references are hereby incorporated by reference as though fully set forth herein. The references are cited in the application by referring to the corresponding literature reference number, as follows:
1. Burton, S. H., 2010. Coping with the Curse of Dimensionality by Combining Linear Programming and Reinforcement Learning, pp. 9-53.
2. Littman, M. L., 1994. Markov games as a framework for multi-agent reinforcement learning. In Machine Learning Proceedings, pp. 157-163.
3. Greenwald, A, Hall. K. and Serrano, 2003. Correlated Q-learning. In ICML, Vol. 3, pp. 242-249.
4. Pham, T. H., De Magistris, G. and Tachibana, R 2017. OptLayer-Practical Constrained Optimization for Deep Reinforcement Learning in the Real World. arXiv preprint arXiv:1709.07643.
5. Amos, B. and Kolter, J. Z., 2017. Optnet: Differentiable optimization as a layer in neural networks. arXiv preprint arXiv:1703.00443.

(2) Principal Aspects

Various embodiments of the invention include three "principal" aspects. The first is a system for controlling robots and autonomous vehicles. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
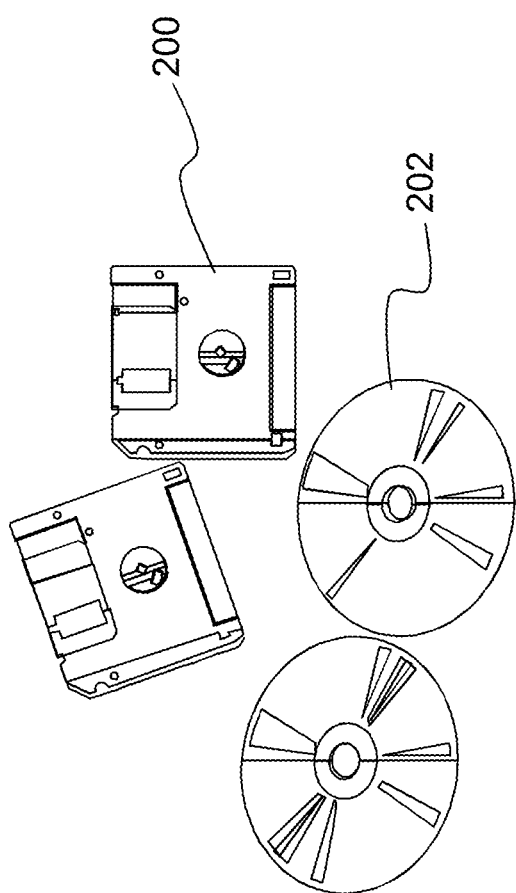
FIG. 2 is an illustration of a computer program product according to some embodiments of the present disclosure.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) Specific Details of Various Embodiments

Described is a system for modifying the training loop of reinforcement learning agents (specifically, neural networks) utilized in the planning and/or control subsystems of robotic or other cyber physical system platforms. The typical reinforcement learning approach consists of an agent who observes its environment, evaluates its current state/observation (e.g., tangential velocity, distance to a vehicle in front), and selects an action (e.g., set target steering angle, adjust throttle). For a control system, the action itself could be to provide a certain input to an actuator (e.g., set steering wheel angle to 15 degrees, etc.). Upon carrying out an action the agent is presented with, in addition to its new state, a reward signal (e.g., +1 for allowing sufficient space between the robot/vehicle and an obstacle in front of it and −1 for allowing insufficient space) which provides some indication of the successfulness of the action. These rewards can be distributed in a wide variety of ways, but they intuitively provide hints as to the agent's goal/objective.

In most modern reinforcement learning systems, the agent is a neural network, as is the case for those agents considered in the present invention, and is trained to try to maximize the total reward received. The outputs of the neural network are sometimes called the policy and constitute or parametrize a probability distribution over the space of all possible actions (from the current state). The set of possible actions is the set of what kinds of actions the agent (software) is capable of making the robot/vehicle carry out (e.g., turn the steering wheel to 15 degrees, increase throttle, etc.). The set of possible actions is a fixed set independent of the current state or augmented training.

The invention described herein uses a Satisfiability Modulo Theories (SMT)-solver as an oracle that can be queried in order to generate batches of states, satisfying designated properties, that are independently known to be good or bad. In particular, by using a SMT-solver capable of reasoning over non-linear activation functions the state batch generated reflects properties of states with respect to the agent's actual policy at that time. Unlike related approaches for generating interesting trajectories, the system according to embodiments of the present disclosure takes into account the actual state of the neural network at the time that the batches are generated. Furthermore, the method described herein relies on analyzing the network's mathematical structure to gather state batches that are relevant to the agent and does not require that the agent actually having experienced the gathered states. This procedure is called introspection, and it allows the agent to improve its learning outcomes without exposing it to potentially dangerous experiences.

Suppose a reinforcement learning algorithm A will be used to train a neural network π to select actions for a fixed mobile platform. Non-limiting examples of platforms include autonomous vehicles (cars, quadrotors, etc.), robotic arms, and manipulators for manufacturing, medical devices, or other kinds of robots. The role of the neural network π, called the policy network, is to select actions for the platform to take on the basis of its current observed state (as determined via, for example, its sensors such as wheel encoders and accelerometers). Explicitly, given a state s, the value it(s) is a probability distribution (or its parameterization) over the space of valid actions that the policy can take while in state s (the action space). The platform may then select its actions either by sampling from the probability distribution or (in the discrete case) by selecting the action corresponding to the argmax of π(s). It is also assumed that a procedure for training π has been selected. Given this data, the invention described herein modifies the normal training procedure of π in such a way that a reasonable policy satisfying the desired performance and safety constraints will be found more quickly.

Figure 3:
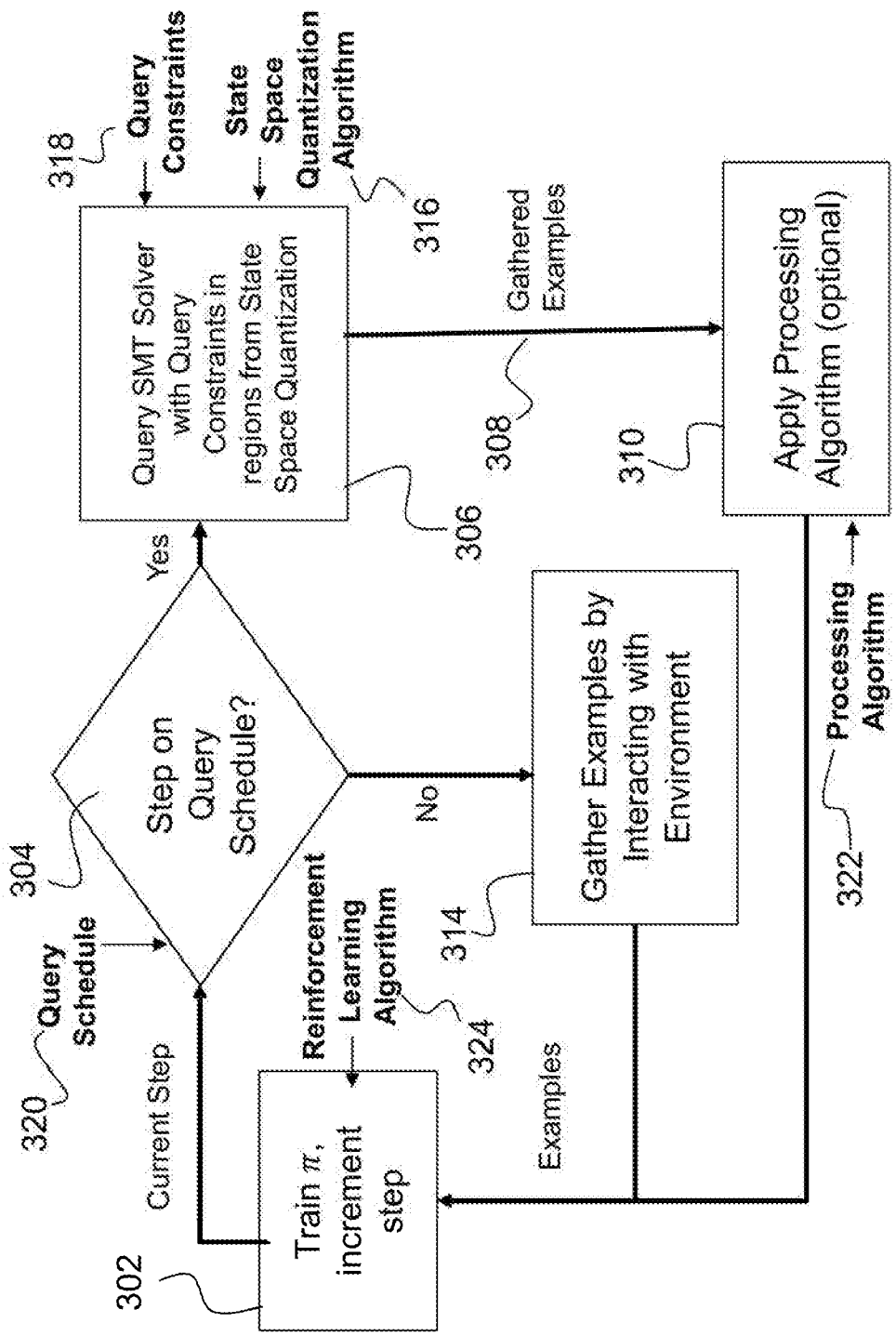
FIG. 3 is a flow diagram depicting a system for controlling robots and autonomous vehicles according to some embodiments of the present disclosure.

The basic procedure of the method according to embodiments of the present disclosure is summarized in FIG. 3. In operation, the neural network reinforcement learning agent is initialized. Typically, the weights are randomly initialized. The neural network is then trained (element 302) based on a current state of a mobile platform (element 516). The system then determines if the current increment step is on the query schedule (element 304). If so, then the SMT solver is queried (element 306) to generate the gathered examples (element 308), or state batches, satisfying specified constraints. In some cases it may be necessary and/or useful to apply a processing algorithm (element 310) to post-process the gathered examples (element 308) (e.g., to ensure sufficient balance/symmetry properties). If that is the case, the gathered examples (element 308) are processed and the network is trained on them (element 302) according to a designated procedure. As a non-limiting example, processing may be needed if the condition in question is symmetrical (e.g., don't go off the road) and the examples are all violations, where the agent goes off of the left side of the road. Then, the gathered examples (element 308) should be symmetrized to include going off the right side of the road. Following training (element 302), an action to be performed by the mobile platform (516) in its environment is selected (i.e., select action (element 510) from probability distribution π(s)), and the mobile platform (element 516) performs the selected action in its environment.

In reinforcement learning, the agent interacts with its environment in order to receive a reward signal. If the current increment step is not on the query schedule, then the system gathers examples by interacting with the environment (element 314) surrounding the mobile platform (element 516) and obtaining observed states via sensors on the mobile platform (element 516). The combination of observed state and received reward are used in a variety of ways (depending on the exact "designated procedure" being used) to update the weights of the neural network in order to try to cause the mobile platform (element 516) to act in such a way that it will (hopefully) receive a larger (positive) reward signal in the future. The normal training (element 302) then resumes.

As shown in FIG. 3, elements of the invention, which are inputs to the procedure described herein, comprise:
(1) a state space quantization algorithm (element 316);
(2) query constraints (element 318);
(3) a query schedule (element 320);
(4) an optional processing algorithm (element 322); and
(5) a reinforcement learning algorithm (element 324).

The purpose of the state space quantization algorithm (element 316) is to provide a mechanism for generating multiple examples utilizing the SMT solver. In experimental studies, the state space quantization algorithm (element 316) was implemented as a simple quantization that ignores regions of state space where examples satisfying the query constraints (element 318) are impossible to find. The quantization should be sufficiently fine grained to allow sufficiently many and diverse examples to be generated.

Query constraints (element 318) determine what kind of examples are to be generated. Query constraints (element 318) are, by definition, formulae in the first-order theory of real arithmetic augmented with common non-linear functions (e.g., hyperbolic tangent, exponentiation, etc.). The query schedule (element 320) determines when the solver is to be queried to generate the gathered examples (element 308) (state batches). If the gathered examples (element 308) lack the sufficient balance/symmetry properties, post-processing is triggered, as described above. This is the purpose of the optional post-processing algorithm (element 322), which is optional and often unneeded. Finally, the reinforcement learning algorithm (element 324) for training controls how the gathered examples should be trained on. In experimental studies, it is usually sufficient to train on these as terminal states with high-negative or high-positive reward, however other approaches can also be considered.

Experiments were conducted with the DDQN algorithm (a reinforcement learning algorithm (element 324)) and OpenAI Gym "Lunar Lander" environment where the objective is to safely land a spacecraft on the surface of the moon by controlling its three engines. The inputs were set as follows. For the query schedule (element 320), it was determined at what interval batches will be searched for and when searching for batches will cease and training will proceed as normal. Two versions were tested. In the first version, gathered examples (element 308), or state batches, are only gathered on the first iteration, and the initial random policy is shaped by reducing the error on the state batches found by the solver. In the second version, solving for state batches continues at a predetermined interval (e.g., every 100 episodes) and ceases when the average reward crosses a predetermined threshold. In both cases, for training on state batches, states found were treated as terminal states with high negative reward (e.g., −100) as determined by the rules of the environment.

The query constraints (element 318), in both cases, were to look for states outside of the landing zone (i.e., the region of the state space which the agent is supposed to navigate to as per the goals of the task), such that the agent favors, with high probability, selecting an action (element 510) that would result in it moving further away from the landing zone. Note that alternative choices of query constraints (element 318) are also possible including, for instance, querying for those states that move the agent in the correct direction which could be given extra reward. The approach described herein is based on trying to minimize the number of obviously risky actions the agent is likely to carry out during training, while allowing the agent freedom to explore reasonable actions.

Figure 4A:
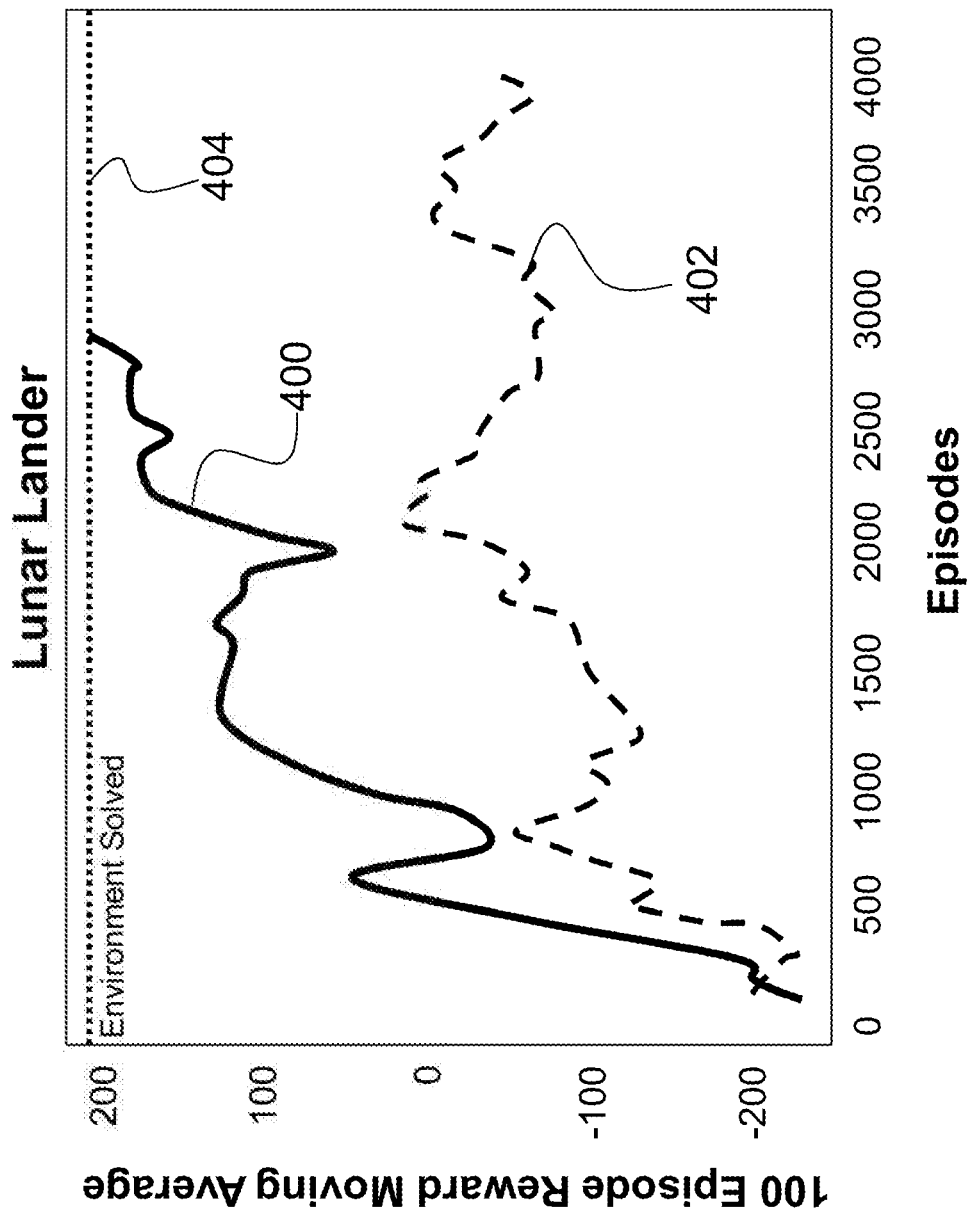
FIG. 4A is a plot illustrating results from querying a solver only after initialization according to some embodiments of the present disclosure.
Figure 4B:
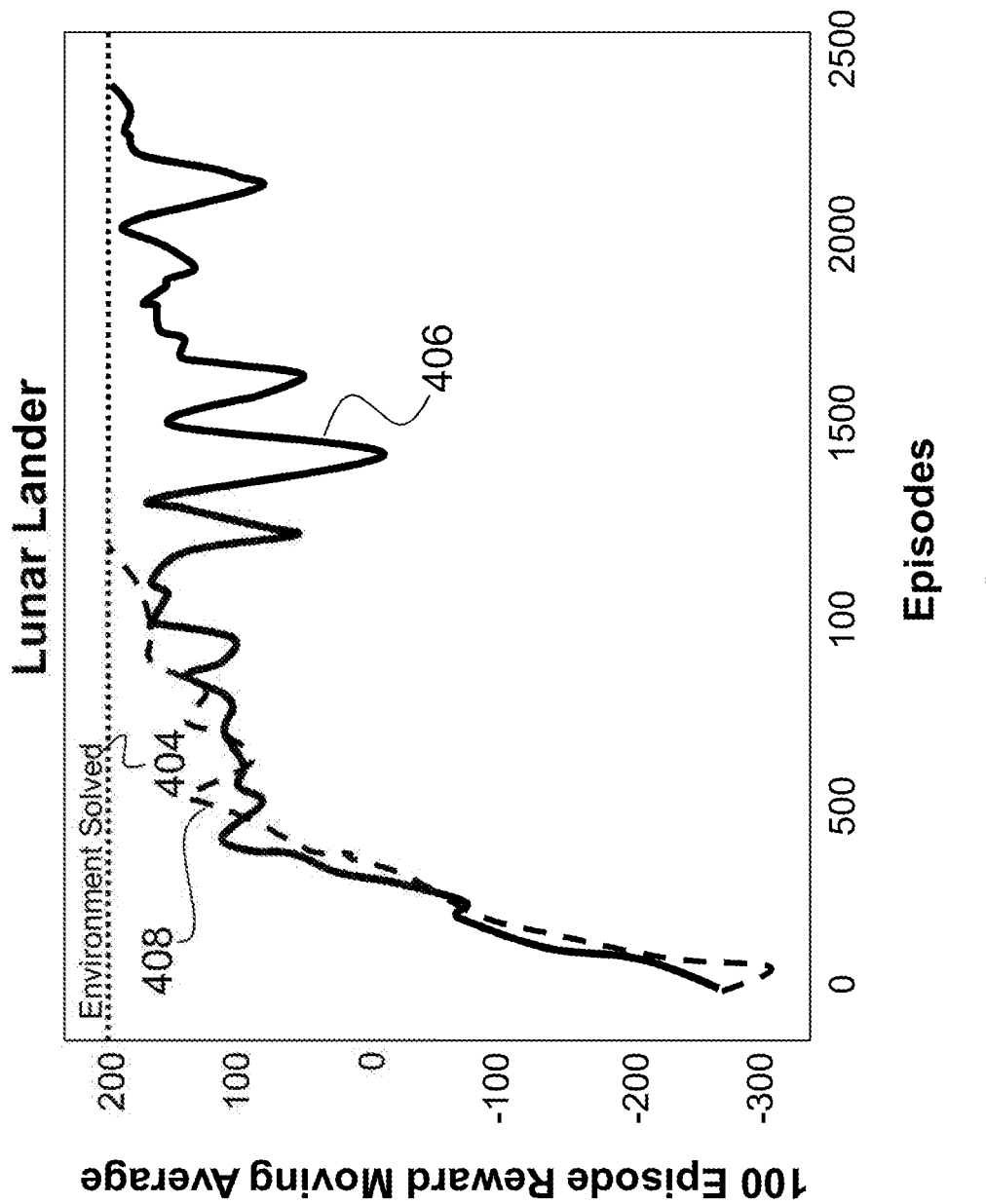
FIG. 4B is a plot illustrating results from periodic querying of a solver according to some embodiments of the present disclosure.

The results of the experiments are summarized in FIGS. 4A and 4B, which capture the results of experiments performed with both periodic querying of the solver and querying only after initialization. For an initial query (FIG. 4A), the agent trained with the invention (solid curve 400) finds a solution in ~2900 episodes (45 minutes), whereas the baseline agent (dashed curve 402) takes around two hours to converge (first 95 minutes as shown). The dashed line 404 represents the optimal solution. In this case, the additional time required by the solver of the invention at initialization is approximately 5-10 minutes. The experiment depicted in FIG. 4B involved periodic query, where convergence to an optimal policy with the invention (solid curve 406) is twice as fast as for the baseline agent (dashed curve 408).

In both cases, the approach described herein (represented by curves 400 and 406 in FIGS. 4A and 4B) is able to find an optimal solution (element 404) at least twice as fast as the baseline (represented by curves 402 and 408 in FIGS. 4A and 4B). In each case, the same reinforcement learning algorithm A is used for both the baseline and the agent trained with the procedure according to embodiments of the present disclosure. These two experiments use different baseline agents, which accounts for the difference between the two experiments in number of episodes required for convergence.

In all applications of the invention described herein, careful consideration should be given to how the state batches found will bias the policy as it may introduce instability to the policy particularly when it is converging on a local optimum. It has generally been found that incorporating the state batches into the policy learning is beneficial early in the learning process when the policy is poor. In implementation, it is necessary to integrate the solver with the reinforcement learning training loop and to translate the neural network into an expression that can be consumed by the solver. The translation from the neural network code (e.g., Python code) to the solver expression is a straightforward procedure that can be readily accomplished by anyone familiar with both writing neural networks and using SMT solvers. It could also be accomplished using automatic tools if the implementer has developed such tools (for the networks used in experimental studies of the invention, such automation was unnecessary). In order for the SMT solver and the Python reinforcement learning code to interact, it is necessary to wrap the solver code (assuming it is not thread safe) using something like the Python multiprocessing library (which itself wraps operating system specific multiprocessing calls), that way many examples can be found simultaneously. This integration is entirely straightforward for anyone who is familiar with the Python multiprocessing library and the use of SMT solvers.

The final step of deploying the system according to embodiments of the present disclosure is integrating the reinforcement learning agent on the actual platform (robot, vehicle, etc.), which can be accomplished using standard techniques for integrating software on a robot/vehicle. The invention described herein can be used to obtain reinforcement learning agents that, in experiments, converge to successful policies as much as three times more quickly than without the use of the invention. Given that, for some use cases, these algorithms can take weeks to train (e.g., DeepMind's original Alpha Go), the invention described herein could potentially save months of training time. Additionally, because introspection permits the discovery of states in which the agent would take potentially dangerous actions without actually experiencing those states, the agent will be less likely to perform dangerous actions when trained online than an agent trained by alternative means. Thus, the invention described herein is fundamentally different from previous approaches as an agent's policy is shaped by finding state batches that would violate stated constraints without needing the agent to actually experience these states.

FIG. 5A depicts a flow diagram of an example operation of the system described herein. One or more sensors (element 500), such as wheel encoders and accelerometers, connected with the mobile platform are used to sense the mobile platform's state (element 502) in its environment (element 504). Based on the observed state (element 506), a neural network agent (element 508) selects actions (element 510) for the mobile platform to take via one or more actuators (element 512), such as wheels or a braking mechanism. The actuator(s) (element 512) causes motion of the mobile platform (element 514). FIG. 5B illustrates a diagram of an example mobile platform (element 516) having a pair of sensors (element 500) and a pair of actuators (element 512).

The system according to embodiments of the present disclosure is of use to vehicle manufacturers in places where they are currently using computationally intensive control algorithms that could be replaced with neural network reinforcement learning agents, or other places (e.g., autonomous taxi of aircraft, on-the-fly trajectory planning for autonomous cars, etc.) where complex planning or control procedures are currently carried out by humans. The invention described herein is especially useful for platforms that may be trained online and are likely to be more robust than agents trained with other techniques.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for controlling a mobile platform, the system comprising:
   the mobile platform having one or more sensors thereon; and
   one or more processors and a non-transitory computer-readable medium having executable instructions encoded thereon such that when executed, the one or more processors perform operations of:
   determining a current states of the mobile platform via the one or more sensors;
   initially training a neural network $\pi$ that is integrated on the mobile platform, wherein the initial training is based on the current states of the mobile platform;
   querying a Satisfiability Modulo Theories (SMT) solver when it is determined that a current increment step is on a query schedule, wherein the query schedule determines when to query the SMT solver to generate a plurality of examples of states satisfying specified constraints of the mobile platform;

modifying the initial training of the neural network $\pi$ based on the plurality of examples of states;

following training on the plurality of examples of states, selecting an action to be performed by the mobile platform in its environment, wherein the action is selected from a probability distribution $\pi(s)$ over a space of valid actions that the mobile platform can take while in the current states; and causing the mobile platform to perform the selected action in its environment.

2. The system as set forth in claim 1, wherein the one or more processors further perform an operation of generating the plurality of examples of states utilizing the SMT solver by implementing a state space quantization algorithm.

3. The system as set forth in claim 2, wherein the one or more processors further perform an operation of applying at least one query constraint when generating the plurality of examples of states.

4. The system as set forth in claim 1, wherein the one or more processors further perform operations of:

applying a processing algorithm to the plurality of examples of states, resulting in a set of processed examples of states; and training the neural network $\pi$ on the set of processed examples of states.

5. A computer implemented method for controlling a mobile platform, the method comprising an act of:

causing one or more processors to execute instructions encoded on a non-transitory computer-readable medium, such that upon execution, the one or more processors perform operations of:

determining a current states of a mobile platform via one or more sensors on the mobile platform;

initially training a neural network $\pi$ it that is integrated on the mobile platform, wherein the initial training is based on the current states of the mobile platform;

querying a Satisfiability Modulo Theories (SMT) solver when it is determined that a current increment step is on a query schedule, wherein the query schedule determines when to query the SMT solver to generate a plurality of examples of states satisfying specified constraints of the mobile platform;

modifying the initial training of the neural network $\pi$ based on the plurality of examples of states;

following training on the plurality of examples of states, selecting an action to be performed by the mobile platform in its environment, wherein the action is selected from a probability distribution $\pi(s)$ over a space of valid actions that the mobile platform can take while in the current states; and causing the mobile platform to perform the selected action in its environment.

6. The method as set forth in claim 5, wherein the one or more processors further perform an operation of generating the plurality of examples of states utilizing the SMT solver by implementing a state space quantization algorithm.

7. The method as set forth in claim 6, wherein the one or more processors further perform an operation of applying at least one query constraint when generating the plurality of examples of states.

8. The method as set forth in claim 5, wherein the one or more processors further perform operations of:

applying a processing algorithm to the plurality of examples of states, resulting in a set of processed examples of states; and training the neural network $\pi$ on the set of processed examples of states.

9. A computer program product for controlling a mobile platform, the computer program product comprising:

computer-readable instructions stored on a non-transitory computer-readable medium that are executable by a computer having one or more processors for causing the processor to perform operations of:

determining a current states of the mobile platform via one or more sensors;

initially training a neural network $\pi$ that is integrated on the mobile platform, wherein the initial training is based on the current states of the mobile platform;

querying a Satisfiability Modulo Theories (SMT) solver when it is determined that a current increment step is on a query schedule, wherein the query schedule determines when to query the SMT solver to generate a plurality of examples of states satisfying specified constraints of the mobile platform;

modifying the initial training of the neural network $\pi$ based on the plurality of examples of states;

following training on the plurality of examples of states, selecting an action to be performed by the mobile platform in its environment, wherein the action is selected from a probability distribution $\pi(s)$ over a space of valid actions that the mobile platform can take while in the current states; and causing the mobile platform to perform the selected action in its environment.

10. The computer program product as set forth in claim 9, further comprising instructions for causing the one or more processors to further perform an operation of generating the plurality of examples of states utilizing the SMT solver by implementing a state space quantization algorithm.

11. The computer program product as set forth in claim 10, further comprising instructions for causing the one or more processors to further perform an operation of applying at least one query constraint when generating the plurality of examples of states.

12. The computer program product as set forth in claim 9, further comprising instructions for causing the one or more processors to further perform operations of:

applying a processing algorithm to the plurality of examples of states, resulting in a set of processed examples of states; and training the neural network $\pi$ on the set of processed examples of states.

* * * * *